United States Patent
Day

(10) Patent No.: US 8,008,806 B2
(45) Date of Patent: Aug. 30, 2011

(54) METERING PUMP POWER SOURCE

(75) Inventor: Thomas Day, Riverside, NJ (US)

(73) Assignee: Milton Roy Company, Ivyland, PA (US)

( * ) Notice: Subject to any disclaimer, the term of this patent is extended or adjusted under 35 U.S.C. 154(b) by 0 days.

(21) Appl. No.: 12/878,740

(22) Filed: Sep. 9, 2010

(65) Prior Publication Data

US 2011/0006608 A1    Jan. 13, 2011

Related U.S. Application Data

(63) Continuation of application No. 12/218,426, filed on Jul. 15, 2008, now Pat. No. 7,821,159.

(51) Int. Cl.
*H02J 1/12* (2006.01)
*H02J 7/00* (2006.01)

(52) U.S. Cl. ............ 307/64; 307/45; 307/46; 307/48

(58) Field of Classification Search ............ 307/45, 307/46, 48, 65
See application file for complete search history.

(56) References Cited

U.S. PATENT DOCUMENTS

| | | | |
|---|---|---|---|
| 6,372,978 B1 | 4/2002 | Cifaldi | |
| 6,559,552 B1 | 5/2003 | Ha | |
| 6,712,906 B2 | 3/2004 | Estelle et al. | |
| 6,768,285 B2 | 7/2004 | James | |
| 7,888,590 B2 * | 2/2011 | Niederer | 136/251 |
| 2006/0137348 A1 | 6/2006 | Pas | |
| 2008/0231119 A1 * | 9/2008 | Yeh | 307/65 |

* cited by examiner

*Primary Examiner* — Rexford Barnie
*Assistant Examiner* — Hal Kaplan
(74) *Attorney, Agent, or Firm* — Kinney & Lange, P.A.

(57) ABSTRACT

A power supply system includes an energy generator and an energy storage system, each electrically connected to a power bus. The power bus provides electrical power to a load. The energy generator includes a wind turbine and a solar panel. The energy storage system includes a storage device and a regulator. The regulator is configured to transfer energy from the power bus to the storage device when the power bus exceeds a maximum voltage and to transfer energy from the storage device to the power bus when the power bus drops below a minimum voltage.

20 Claims, 2 Drawing Sheets

METERING PUMP POWER SOURCE

CROSS-REFERENCE TO RELATED APPLICATION

This application is a continuation of U.S. patent application Ser. No. 12/218,426, entitled "METERING PUMP POWER SOURCE" filed on Jul. 18, 2008 by Thomas Day.

BACKGROUND

The present invention relates to power sources, and more particularly, to power sources for metering pumps of chemical dosing systems.

Metering pumps provide high pressure chemical dosing for various needs. Typically, metering pumps run on electric power. In certain circumstances, metering pumps are needed in areas where electrical power is either not available or compromised, such as oil and gas pipelines, remote water treatment, on-site water disinfection, and localized odor control. In such circumstances, electrical power is typically provided by a gasoline or diesel generator.

"Green" power sources that can harvest energy from nature without combustion of hydrocarbons have long been available. Examples of green power sources include solar panels and wind turbines. Typically, green power sources first harvest energy from nature; second, the power source transfers the energy to an electric battery; third, the electric battery powers a particular load device. The power source, electric battery, and particular load device are typically connected in series.

When a specific green power source is chosen to power a particular load device, certain assumptions are made. First, it is assumed that there will be extended periods of time when nature will not provide power to be harvested. For example, it is assumed that solar energy will not be available at night. Second, it is assumed that the particular load device may operate for a continuous period of time at its maximum rated power draw. Both of these assumptions are used when choosing the type and size of power source and battery for a given application.

SUMMARY

According to the present invention, a power supply system includes an energy generator and an energy storage system, each electrically connected to a power bus. The power bus provides electrical power to a load. The energy generator includes a wind turbine and a solar panel. The energy storage system includes a storage device and a regulator. The regulator is configured to transfer energy from the power bus to the storage device when the power bus exceeds a maximum voltage and to transfer energy from the storage device to the power bus when the power bus drops below a minimum voltage.

DETAILED DESCRIPTION

In general, the present invention provides a green energy generator and an energy storage system for powering a metering pump. The size and type of green energy generator is chosen, specifically to power a particular metering pump at a particular location, for a particular operation. The size and type of energy storage system is chosen to supplement the power provided by the green energy generator, when needed.

Figure 1:
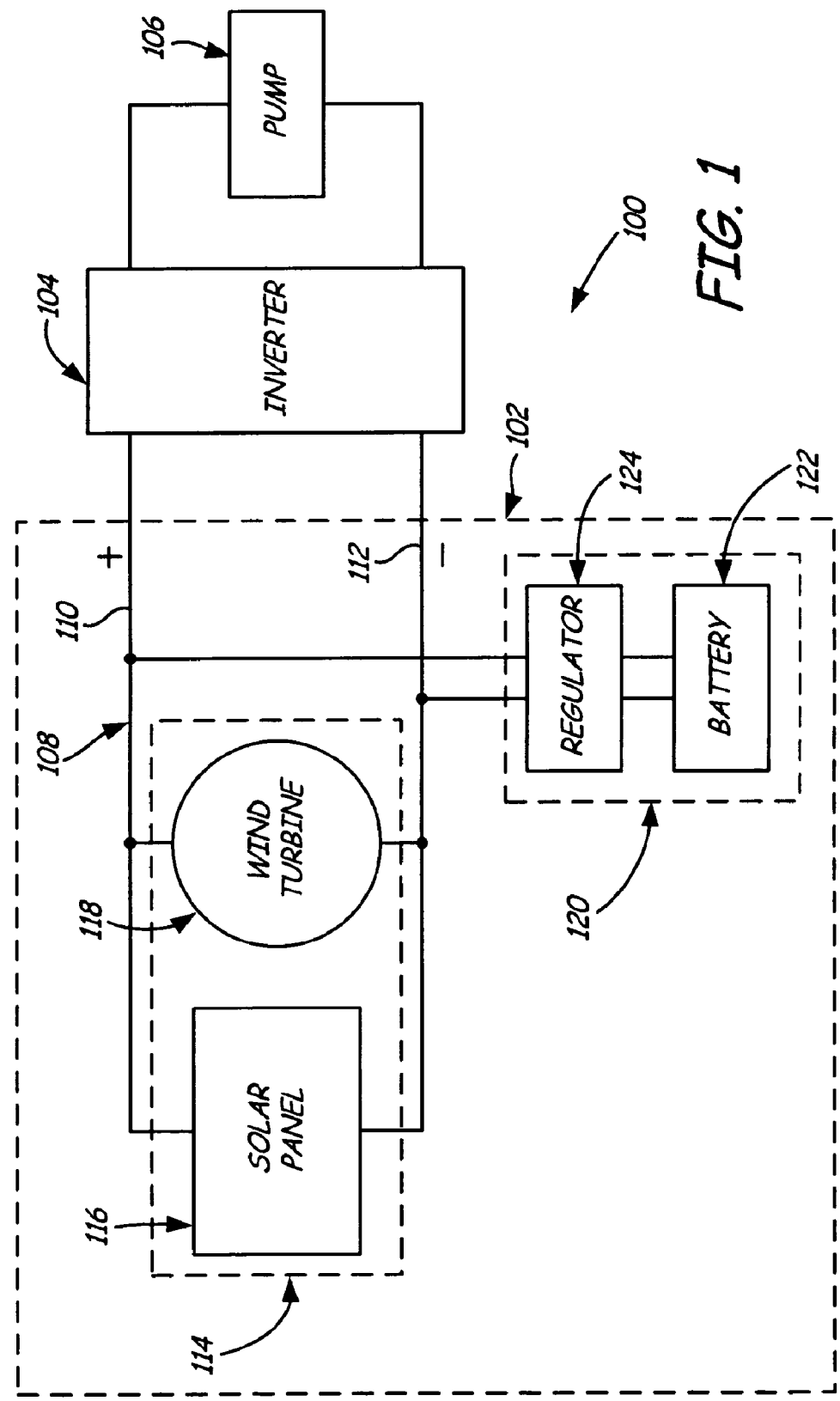
FIG. 1 is a schematic view of the chemical dosing system of the present invention.

FIG. 1 is a schematic view of chemical dosing system 100. Chemical dosing system 100 includes power supply system 102, inverter 104, and pump 106. Power supply system 102 supplies DC (direct current) power to inverter 104. Inverter 104 converts the DC power into AC (alternating current) power and supplies the AC power to pump 106 in those instances in which pump 106 includes an AC motor drive. Alternatively, if pump 106 has a DC motor drive, inverter 104 may be replaced by a DC/DC converter or a DC motor controller. Pump 106 is a metering pump and provides high pressure chemical dosing for a particular operation. In certain embodiments, pump 106 can be any of the following metering pumps manufactured by Milton Roy USA in Ivyland Pa.: mRoy A Series, LMI A Series, LMI P Series, or LMI E Series. In other embodiments, pump 106 can be virtually any pump that would benefit from the power source of the present invention. In still other embodiments, pump 106 can be replaced by another load device that would benefit from the power source of the present invention.

Power supply system 102 includes power bus 108 (having positive rail 110 and negative rail 112), green energy generator 114 (which includes solar panel 116 and wind turbine 118), and energy storage system 120 (which includes battery 122 (or other storage device) and regulator 124). Green energy generator 114 and energy storage system 120 are connected in parallel between positive rail 110 and negative rail 112.

Green energy generator 114, which includes solar panel 116 and wind turbine 118, is the primary source of power supplied to inverter 104 and pump 106. Solar panel 116 is configured to harvest solar energy emitted from the sun or other light sources and convert the solar energy into electrical energy. The function of solar panel 116 is well known in the art. Wind turbine 118 is configured to harvest wind energy and convert the wind energy into electrical energy. The function of wind turbine 118 is also well known in the art.

Energy storage system 120 includes battery 122 and regulator 124. Energy storage system 120 provides supplemental DC power to inverter 104 at times when green energy generator 114 is unable to meet the needs of pump 106. Battery 122 may include a single battery, multiple batteries, or other storage devices such as supercapacitors. Regulator 124 is configured to supply DC power from battery 122 to inverter 104 when the voltage between positive rail 110 and negative rail 112 drops below a minimum value. Regulator 124 is also configured to supply DC power from green energy generator 114 to battery 122 for storage when the voltage between positive rail 110 and negative rail 112 exceeds a maximum value. Typically, green energy generator 114 supplies DC power to battery 122 only when green energy generator 114 is generating power in excess of the needs of pump 106. Thus, battery 122 is not required to be an intermediary between green energy generator 114 and pump 106.

Figure 2:
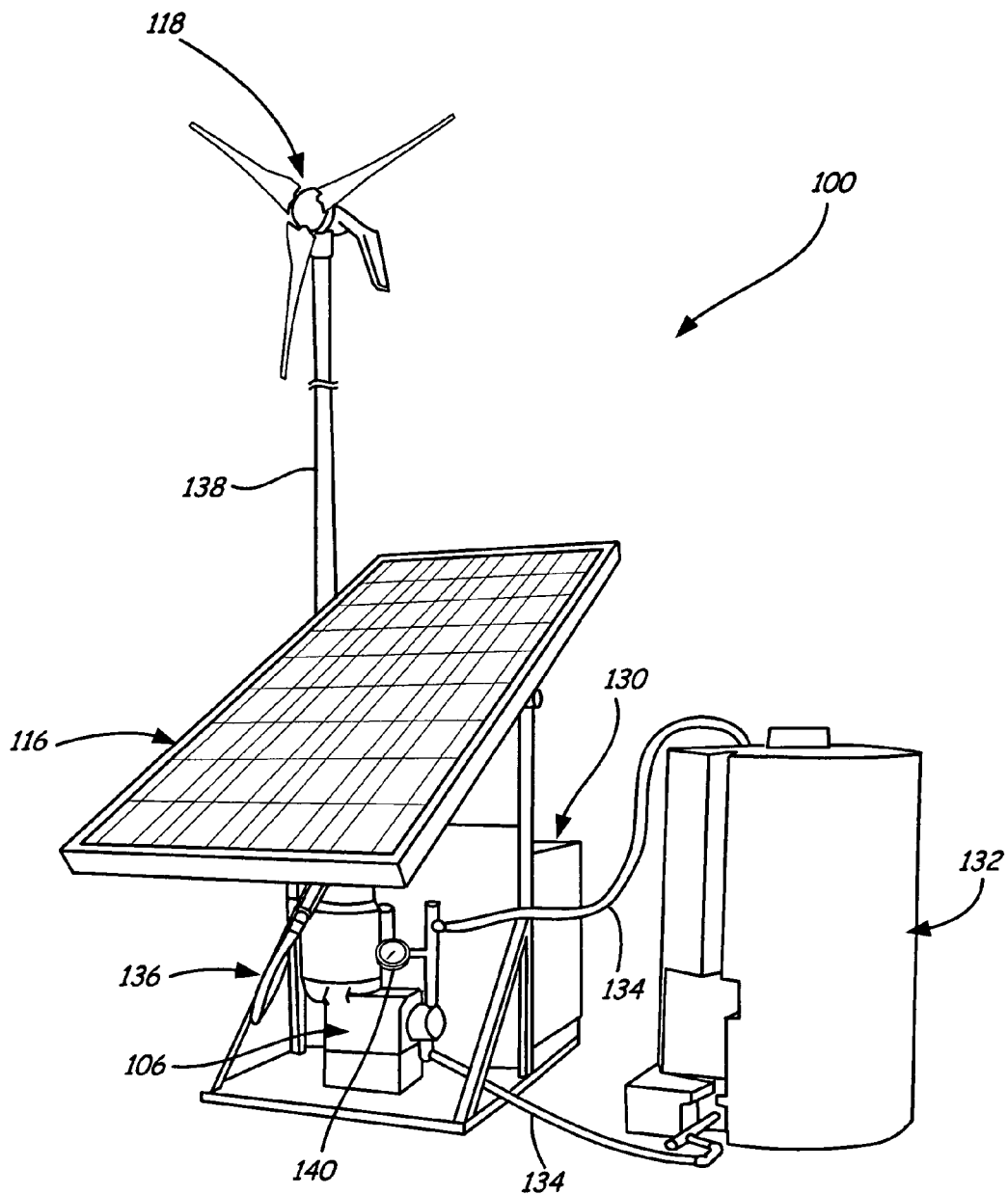
FIG. 2 is a perspective view of the chemical dosing system of the present invention.

FIG. 2 is a perspective view of chemical dosing system 100. As depicted in FIG. 2, chemical dosing system 100 further includes instrument package 130, chemical tank 132, hoses 134, frame 136, mast 138, and meter 140.

Instrument package 130 houses battery 122 and regulator 124. Instrument package 130 is mounted to frame 136. Solar panel 116 and pump 106 are also mounted to frame 136. Wind turbine 118 is mounted to mast 138, which is mounted to frame 136.

Chemical tank 132 stores chemicals required for the particular operation. Chemical tank 132 is connected to pump 106 via hoses 134 to supply the chemicals to pump 106 as needed. Meter 140 is connected to pump 106 for measuring the amount of chemical supplied.

In the prior art, there has been one basic concept used for green power systems. This is to harvest the resource, store the power, and only then use it as needed by a load device. This is defined here as "static" power harvesting. Static power harvesting is identified by a focus on backup storage, generally in the form of a battery or bank of batteries. An energy generator charges a battery, and the battery powers the load device. Various manufacturers have developed equations to calculate the amount of storage required to run the load device for a given time interval. As a result, some choice of storage is either calculated or specified, usually in hours to days, and a system is built around the storage requirement. The problem with designing a power supply system around batteries as the primary power source is that the energy storage requirements can become very large. Batteries are one of the weakest links in any system where they are employed. Adding more and larger batteries increases the risk of system failure.

Power supply system 102 of the present invention uses "dynamic" power harvesting. In dynamic power harvesting, load is calculated and the system is sized, based on real time harvesting of green resources. Green energy generator 114 supplies DC power directly to inverter 104 and pump 106 without using battery 122 as an intermediary. So long as green energy generator 114 can supply the needs of pump 106, battery 122 need not provide any supplemental power. Thus, energy storage system 120 needs to be sized large enough to be a filler and energy conditioner, not a primary source of electricity. This significantly reduces the energy storage requirements.

Dynamic power harvesting uses the available natural resources in any given location to directly generate electricity to the load device. Reference for natural resource availability comes from, among other sources, the worldwide wind and solar intensity charts to determine the available power that can be harvested, balanced against the load requirements of the load device. In most circumstances where at least two green power sources (such as solar panel 116 and wind turbine 118) are utilized, it is safe to assume that nature will provide power to be harvested at least 40% of the time in any 24 hour period. In other circumstances where at least two green power sources are utilized, it is safe to assume that nature will always provide power to be harvested, even though the quantity may sometimes be small.

The present invention has a significantly reduced power storage requirement of power supply system 102, while providing the necessary power to the load device. Energy storage system 120 takes on the function of an intermittent power supplier and power signal conditioner rather than the main power source, as found in the static harvesting system. Dynamic power harvesting removes the focus from storage and places it directly on load requirements. This permits the delivery of electric power with little to no modification to the load device.

Dynamic power harvesting also assumes that there is a difference between the maximum power draw of pump 106 and the actual power draw of pump 106. Ordinarily, pump 106 will only operate at its maximum power draw for brief periods, such as during startup. At other times, pump 106 can operate at a reduced actual power draw during continued operation. At still other times, pump 106 can be at rest, requiring zero power draw. Thus, over a period of time, the actual power draw will be less than the maximum possible power draw of pump 106. Therefore, power supply system 102 can be sized for supplying enough power for the actual power draw with only brief periods of maximum power draw. Such a system can be smaller and less expensive than a system sized to support pump 106 constantly operating at maximum power draw.

Pump companies such as Milton Roy Americas use standard motors (such as a ¼ HP motor) in order to reduce costs. Fractional HP (horsepower) motors below ¼ HP are actually more expensive than the standard ¼ HP motor. Thus, certain pumps use motors with a greater than necessary capacity. Power supply systems do not, however, need to be sized to the motor's maximum power when the motor operates at less than maximum power the majority of the time. Instead, power supply system 102 can be sized to the actual power draw of pump 106 with a safety factor.

In the case of solenoid driven pumps, the actual power consumption is published and typically ranges between 22 W and 90 W depending on the model. Therefore, the same methodology that is presented for motor pumps is not applicable but is more exact because the drive unit is sized exactly to the flow and pressure requirements.

Power supply system 102 can supply power to existing metering pumps (i.e. pumps originally installed with power supply systems different than the power supply system disclosed herein) without significant modification.

It will be recognized that the present invention provides numerous benefits and advantages. For example, an energy storage system sized to be a supplemental power source can be can be smaller and less expensive than an energy storage system sized to be the main power source. Further, smaller and fewer batteries decreases the risk of system failure. Moreover, using green power is less damaging to the environment than burning fossil fuels in a gasoline or diesel generator.

Although the present invention has been described with reference to preferred embodiments, workers skilled in the art will recognize that changes may be made in form and detail without departing from the spirit and scope of the invention. For example, other types of green energy could be harvested in addition to, or instead of, wind and solar power.

What is claimed is:
1. A chemical dosing system comprising:
    a metering pump; and
    a power supply system electrically connected to the metering pump for supplying all electrical power requirements of the metering pump and supplying electrical power solely for operation of the metering pump, the power supply system comprising:
        an energy generator comprising a wind turbine and a solar panel, wherein the energy generator is electrically connected to the metering pump and is a main power source for the metering pump; and
        an energy storage system comprising a regulator and a battery, wherein the energy storage system is electrically connected to both the energy generator and the metering pump, and wherein the energy storage system provides power to the metering pump only when the metering pump requires power in excess of power provided by the energy generator.

2. The chemical dosing system of claim 1, and further comprising:
    a frame connected to the metering pump, the wind turbine, the solar panel, and the energy storage system.

3. The chemical dosing system of claim 1, wherein the energy storage system is sized to supplement an expected minimum power output for the energy generator during a 24 hour period so that power demanded by the metering pump is met during the 24 hour period.

4. The chemical dosing system of claim 3, wherein the expected minimum power output for the energy generator is based upon historical wind and solar intensity data for a location of the chemical dosing system.

5. The chemical dosing system of claim 4, wherein the energy storage system is sized for operation in a location where an amount of solar energy available for harvesting by the solar panel plus an amount of wind energy available for harvesting by the wind turbine is expected to be greater than zero at all times.

6. The chemical dosing system of claim 4, wherein the energy storage system is sized for operation in a location where an amount of solar energy available for harvesting by the solar panel plus an amount of wind energy available for harvesting by the wind turbine is expected to be greater than zero, 40% of the time in any 24 hour period.

7. The chemical dosing system of claim 1, wherein the metering pump comprises a motor that operates at less than a maximum capacity over 50% of the time.

8. The chemical dosing system of claim 1, wherein the metering pump comprises a solenoid pump that operates at a maximum power draw for brief intervals spaced by intervals of reduced power draw.

9. The chemical dosing system of claim 1, wherein the energy generator supplies power to the energy storage system when the energy generator generates power in excess of the power required by the metering pump.

10. The chemical dosing system of claim 1, wherein the solar panel, the wind turbine, the energy storage system, and the metering pump are electrically connected to a power bus in parallel.

11. The chemical dosing system of claim 1, and further comprising:
an inverter for converting DC (direct current) power provided by the energy generator and the energy storage system into AC (alternating current) power for use by the metering pump.

12. A chemical dosing system comprising:
a frame;
a metering pump mounted to the frame; and
a power supply system electrically connected to the metering pump, the power supply system comprising:
a green energy generator mounted to the frame, wherein the green energy generator is electrically connected to the metering pump and is a main power source for the metering pump; and
an energy storage system comprising a regulator and a battery, wherein the energy storage system is electrically connected to both the green energy generator and the metering pump, and wherein the energy storage system provides power to the metering pump when the metering pump requires power in excess of power provided by the green energy generator.

13. The chemical dosing system of claim 12, wherein the green energy generator comprises:
a solar panel mounted to the frame; and
a wind turbine mounted to a mast which is mounted to the frame.

14. The chemical dosing system of claim 12, wherein the energy storage system is sized to power only the metering pump by supplementing a predicted power generation performance for the energy generator so that power demanded by the metering pump is met during all operating periods of the metering pump.

15. A method for designing a power supply system for a metering pump, the method comprising:
determining an expected energy consumption of the metering pump;
selecting components for a green energy generator to operate as a primary power source for the metering pump and only for the metering pump; and
selecting components for an energy storage system, sized to provide supplemental power to the metering pump during all times when the green energy generator is unable to meet the expected energy consumption of the metering pump, and sized to provide power only to the metering pump.

16. The method of claim 15, wherein the components for both the green energy generator and the energy storage system are selected to meet the expected energy consumption at a particular location of operation.

17. The method of claim 16, and further comprising the step of:
referencing wind and solar intensity charts for the particular location of operation for selection of the components of the green energy generator.

18. The method of claim 15, wherein the expected energy consumption is determined for a particular operation selected from the group consisting of: remote water treatment, water disinfection, odor control, use on an oil pipeline, and use on a gas pipeline.

19. The method of claim 15, and further comprising the step of:
selecting a solar panel and a wind turbine as components for the green energy generator.

20. The method of claim 15, and further comprising the step of:
mounting the metering pump, the green energy generator, and the energy storage system to a frame.

* * * * *